Dec. 1, 1959   W. A. TOLSON   2,915,247
SERVO SYSTEM
Filed Oct. 25, 1955
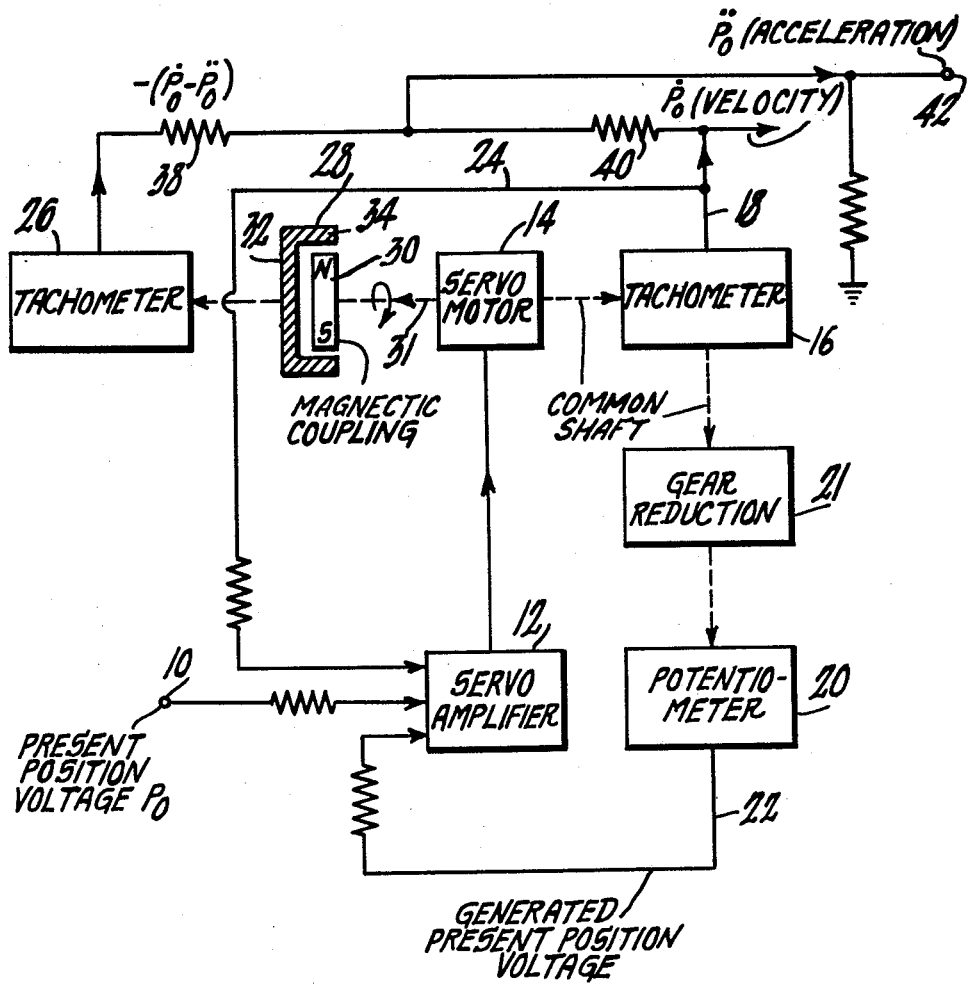
INVENTOR.
William A. Tolson
BY
ATTORNEY

2,915,247
Patented Dec. 1, 1959

2,915,247

SERVO SYSTEM

William A. Tolson, Hightstown, N.J., assignor to Radio Corporation of America, a corporation of Delaware Application October 25, 1955, Serial No. 542,634

9 Claims. (Cl. 235—183)

The present invention relates to an improved system for providing information as to the velocity and acceleration of a moving object.

In computers for fire control, the predicted position of a target may be computed from information as to its present position, its velocity and acceleration. When servo motors are used for this purpose, it has heretofore been necessary to employ two such motors for each axis of prediction. The input signal to the first servo motor represents the present target position along a particular axis. This servo motor drives a potentiometer or other position indicating device, and a tachometer. The output signal of the potentiometer is applied to the input circuit of the motor for balancing the input signal, thereby closing the servo loop. The speed of the first servo motor is proportional to the rate of change of position, or velocity, whereby the tachometer driven by the first motor generates a voltage proportional to velocity. The velocity voltage is used as the input signal to the second servo motor. The latter drives a second tachometer and a second balancing potentiometer. The second potentiometer output voltage is proportional to target velocity, and the second tachometer output voltage is proportional to rate of change of velocity, or acceleration.

An object of the invention is to provide an improved and simplified system for deriving information concerning the position, velocity, and acceleration of a moving object.

With the present invention, information as to the position, velocity and acceleration of a moving object may be obtained from a single servo loop. Velocity information is obtained in the conventional way as described in the foregoing paragraph. In addition, a velocity signal-producing device such as a second tachometer is driven by the same servo motor as the first tachometer, but through a coupling which slips during acceleration or deceleration of the motor. The signal output of the second tachometer is indicative of the velocity of the moving object less the acceleration of the object. This signal is subtracted from the velocity signal to obtain a signal indicative of acceleration.

The invention will be described in greater detail by reference to the following description taken in connection with the accompanying drawing wherein the single figure is a schematic, partially blocked diagram of a typical servo system according to the present invention.

A position signal $P_0$ applied to terminal 10 of the system is one of the inputs to servo amplifier 12. The means for deriving the position signal may comprise a radar system and a means for resolving a voltage indicative of the slant range of the target into a coordinate voltage. Since this means forms no part of the present invention and is well known to those skilled in the art it need not be discussed in further detail. Servo amplifier 12 amplifies the position signal to a power level sufficient to drive servo motor 14. The servo motor drives a device such as tachometer 16 which provides an output signal at lead 18 indicative of the velocity $\dot{P}_0$ of the moving target. The servo motor also drives a potentiometer 20 through gear reduction 21. The voltage output of the potentiometer, which may be direct or alternating depending on whether the position signal $P_0$ is direct or alternating, is fed back over lead 22 to the servo amplifier 12. This signal balances out the input signal, as is well known in the art. If desired, a portion of the velocity signal may also be fed back to the input circuit to servo amplifier 12, as shown by lead 24. This signal is a so-called "lead" signal and serves to stabilize the system. This circuit and all others described so far are conventional and well known to those skilled in the art.

Servo motor 14 also drives a second tachometer 26 through a coupling 28 having a relatively high inertia. The coupling shown consists of a permanent magnet 30 connected to output shaft 31 of the motor and a disc shaped member 32 of aluminum, copper or the like formed with a circumferential ridge 34 surrounding magnet 30. This member is sometimes known as a "drag cup."

The coupling 28, per se, acts like the speedometer of an automobile. A permanent magnet rotates inside of and in close proximity to a drag cup. Rotation of the magnet produces a rotating flux which sets up eddy currents in the cup. These currents, in turn, produce a "drag" torque which tends to cause the cup to rotate with the magnet. In the case of an automobile speedometer, the cup is restrained by a spring which produces a restoring force proportional to displacement (Hooke's law). Since the drag torque is proportional to the angular velocity of the magnet, the angular position of a pointer attached to the cup will be proportional to the velocity of the magnet. Since the magnet is driven by the drive shaft of the automobile, it can be calibrated to indicate speed.

In the coupling 28 shown in the drawing, the drag cup 32 is free to rotate and has sufficient inertia to make it a flywheel. If the motor is rotated at a constant speed, the coupling will bring the fly-wheel (and its attached tachometer 26) up to speed from its stand-still position at a relatively slow rate. In theory, the terminal velocity of the fly-wheel 32 is exactly equal to that of the servo motor. In practice, this terminal velocity is slightly less than motor velocity due to friction and windage losses, and to the torque required to overcome losses in the tachometer. However, the error produced by this difference in speed is within acceptable limits for fire control computer work.

In operation, when a target moves at a constant velocity, tachometer 26 will shortly attain the same speed as tachometer 16. Thus, when the target is moving at constant velocity, the output signal of tachometer 26 developed across resistor 38 will be exactly the same as the output signal of tachometer 16 developed across resistor 40. When the velocity is constant, the acceleration is zero as is the output signal available at output terminal 42. However, when target is accelerating or decelerating, tachometer 26 will be driven at a different speed than tachometer 16 and the voltage developed across resistor 38 [$-(\dot{P}_0 - \ddot{P}_0)$] will be different than the voltage developed across resistor 40. The circuit is arranged to subtract the signal across resistor 38 from the one across resistor 40. The resultant signal $\ddot{P}_0$ available at terminal 42 in indicative of the acceleration of the moving target.

What is claimed is:

1. In combination, drive means; means for driving said drive means in accordance with a signal indicative of a position of an object; first means actuated by said drive means for producing a signal indicative of the velocity of said object; a coupling which is subject to slippage during acceleration of an input thereto; second means connected to be actuated by said drive means through said coupling for producing a signal indicative of the velocity of said object less the acceleration of said object; and means for combining the signal indicative of velocity of said object with the signal indicative of velocity of said object less the acceleration of said object to obtain a resultant signal indicative of the acceleration of said object.

2. In the combination as set forth in claim 1, said means for combining including first resistor means connected to receive said signal indicative of the velocity of said object, second resistor means connected to receive said signal indicative of the velocity of said object less the acceleration of said object, and third resistor means connected to said second and third resistor means for deriving a signal therefrom which is the difference between said two signals.

3. In combination, a servo motor; means for driving said servo motor in accordance with a signal indicative of the position of an object; a tachometer connected to be driven by said servo motor for producing a signal indicative of the velocity of said object; a magnetic coupling; a second tachometer connected to be driven by said motor through said coupling for producing a signal indicative of the velocity of said object less the acceleration of said object; and means connected to both tachometers for deriving from said signal indicative of the velocity of said object, and said signal indicative of the velocity of said object less the acceleration of said object, a signal indicative of the acceleration of said object.

4. In combination, a servo system including a servo motor for deriving from an input position signal an output velocity signal; a velocity signal-producing means; means including a coupling which is subject to slippage during acceleration of said motor for connecting said velocity signal-producing means to said servo motor; and means for combining said output velocity signal with the output signal of said velocity signal producing means.

5. In combination, drive means; means for driving said drive means coupled to said drive means in accordance with a first signal; first means for producing a second signal indicative of the rate of change of said first signal; second means connected to be driven by said drive means for producing a third signal indicative of the rate of change of said first signal less the second derivative of said first signal; and means coupled to said first and second means for combining said second signal with said third signal to obtain a resultant signal indicative of the second derivative of said first signal.

6. In the combination as set forth in claim 5, said drive means comprising a servo motor and said means for driving said drive means comprising a servo amplifier.

7. In the combination as set forth in claim 5, said second means being connected to said drive means through a coupling comprising a cup-shaped member formed of a material in which electrical eddy currents may be introduced, said member being coupled to said second means, and a permanent magnet concentrically arranged within said cup-shaped member parallel to the base thereof and mechanically coupled to said drive means.

8. In combination as set forth in claim 7, said second and third means each comprising a tachometer.

9. In combination, a servo motor; means including a servo amplifier for driving said servo motor in accordance with a signal indicative of the position of an object; a tachometer connected to be driven by said servo motor for producing a signal indicative of the velocity of said object; a potentiometer connected to be driven by said servo motor; feedback connections from said tachometer and said potentiometer to the input circuit to said servo amplifier for respectively feeding back a lead voltage and a position voltage to said input circuit; a coupling of relatively high inertia; a second tachometer connected to be driven by said motor through said coupling for producing a signal indicative of the velocity of said object less the acceleration of said object; and means connected to both tachometers for deriving from said signal indicative of the velocity of said object, and said signal indicative of the velocity of said object less said acceleration of said object, a signal indicative of the acceleration of said object.

References Cited in the file of this patent
FOREIGN PATENTS
839,127    Germany _____ May 5, 1952